Sept. 22, 1970  K. E. HUMBERT, JR  3,529,722
COMBINED ANTI-DRAIN BACK VALVE AND BY-PASS VALVE
Filed May 22, 1969
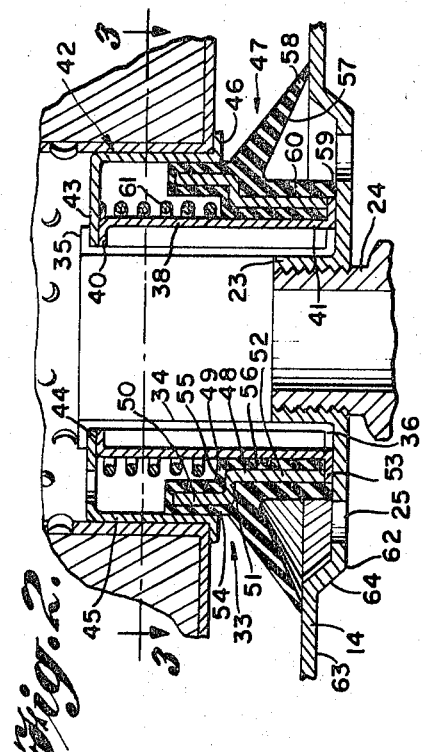
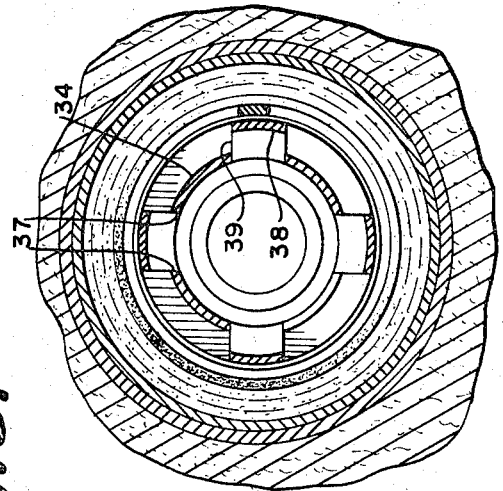
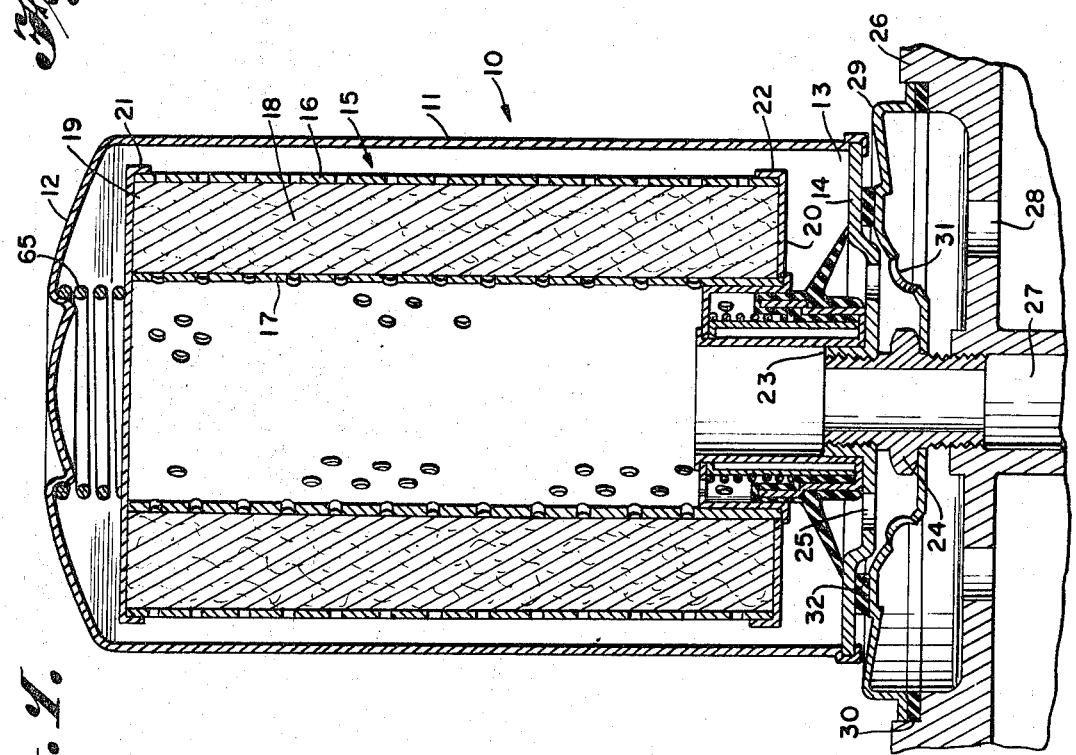
INVENTOR
KINGSLEY E. HUMBERT, JR.
BY *Shoemaker and Mattare*
ATTORNEYS United States Patent Office 3,529,722
Patented Sept. 22, 1970

3,529,722
COMBINED ANTI-DRAIN BACK VALVE AND
BY-PASS VALVE
Kingsley E. Humbert, Jr., Gastonia, N.C., assignor to
Wix Corporation, Gastonia, N.C., a corporation of
North Carolina
Filed May 22, 1969, Ser. No. 826,987
Int. Cl. B01d 35/14
U.S. Cl. 210—130                                    7 Claims

ABSTRACT OF THE DISCLOSURE

A spin-on throw-away filter cartridge having a combined anti-drain back and by-pass valve therein, the valve being openable by a low pressure to allow fluid to enter the cartridge and be filtered by the filter media and further openable by higher pressure to allow fluid to bypass the filter media and be returned directly to point of use.

---

This invention is directed to a spin-on throw-away filter cartridge having a filter media therein and being provided with a combined anti-drain back and by-pass valve.

The principal feature of this invention resides in the combined anti-drain back and by-pass valve and the construction thereof wherein the valve is of an oil resistant rubber compound and is reinforced by a metal insert with the rubber compound being vulcanized thereto. Also the valve housing contains a sleeve with portions cut therefrom and extended outwardly to provide flow passages through the housing.

Another object is to provide a combined anti-drain back and by-pass valve and a housing therefor which is efficient in operation of a sturdy construction and reasonable in cost to produce.

Other objects and advantages of the present invention will be readily apparent from the following detailed description of the invention when considered in connection with the accompanying drawings forming a part thereof, and in which:

FIG. 1 is a vertical sectional view of a filter cartridge embodying the combined anti-drain back and by-pass valve;

FIG. 2 is an enlarged vertical sectional view of the combined anti-drain back and by-pass valve; and FIG. 3 is a top sectional view taken on line 3—3 of FIG. 2.

Referring to the drawings a filter cartridge having a housing generally indicated by the numeral 10 formed of one-piece metal having a body portion 11, a closed end portion 12 at one end of the body portion and an open end 13 closed by a heavy closure plate 14. Mounted within the housing is a filter element generally indicated at 15. The filter element is composed of foraminous outer tube 16 and a foraminous inner tube 17. Between the inner and outer tubes is mounted a filter media 18 which may be of a pleated paper construction or of any other well known filter media. Each end of the filter element is provided with end caps 19 and 20 which are sealed to the filter media 18 and have outer flanges 21 and 22 engaging the outer surface of the outer tube 16.

The heavy plate 14 has an inwardly extending collar 23 which is internally threaded and which engages the externally threaded nipple 24. The collar is formed in the plate 14 in the approximate center thereof. Surrounding the collar are a series of openings 25, these being the inlet openings to the cartridge while the nipple 24 is the outlet from the cartridge. The nipple 24 is mounted on a support, such as an engine block 26, and is connected to a conduit 27 which delivers the filtered fluid to the point of use or a pump to circulate the filtered fluid. Openings 28 provide inlet ports in the support to supply the dirty fluid to the filter cartridge. A plate 29 is mounted on the support 26 and is sealed thereto by a sealing ring 30. The plate 29 is held in sealing engagement with the support by the nipple 24. Openings 31 are provided in the plate 29 to provide passageways for the dirty fluid from the openings 28 to the openings 25 in the filter cartridge. The cartridge carries a sealing ring 32 to seal the cartridge to the plate 29 and to the support 26.

Mounted within the inner tube 17 and extending partially therein adjacent the end cap 20 with the other part extending beyond the end cap 20 and surrounding the collar 23 is a combined anti-drain back and relief valve assembly generally indicated by the numeral 33. The combined valve comprises a central cylindrical sleeve 34 having a short outwardly extending flange 35 at one end and a long outwardly extending flange 36 at the other end which is approximately twice the width of the flange 35. The sleeve has a plurality of pairs of elongated slits 37 cut therein substantially the full length of the body that extend into the flange 36. The material of the sleeve 34 between the pairs of slits 37 is bent outwardly from the body to provide a series of straps 38. The openings 39 made by bending the straps 38 outwardly from the body of the sleeve 34 provide the flow path for the fluid being filtered from the inner tube to the outlet provided by the collar 23 and nipple 24. The upper portion 40 of the straps 38 are bent outwardly from the sleeve 34 and are straight and spaced from the flange 35 the purpose of which will be described later. The lower portion 41 is cut from the flange 36 for approximately one half the width thereof and is bent upwardly therefrom. The straps 38 extend substantially vertically from the flange 36 and are equally spaced from the sleeve 34 throughout their entire length. Although there has been shown four such straps in the drawings, it is to be understood that any number may be used in accordance with the requirements of the amount of fluid passing through the filter cartridge.

The sleeve 34 is seated at the upper end on a cap 42. The cap 42 has an inwardly extending upper flange 43 at the upper part thereof which is provided with an opening 44 substantially in the center thereof. The sleeve 34 extends through the opening 44 and in substantially close engagement therewith. The flange 35 of the sleeve 34 rests on the upper surface of the flange 43 while the flange 40 of the straps 38 engage the under surface of the flange 43. The flange 43 extends into the space between the flanges 35 and 40 and thus aid in supporting the valve assembly. The cap 42 has a substantially straight body portion 45 extending downwardly from the upper flange 43 and is in substantially close engagement with the inner surface of the inner tube 17 adjacent the lower end thereof. Extending outwardly from the body portion 45 of the cap 42 is a substantially straight flange 46 of a relatively short length with relation to the length of the flange 43. The flange 46 engages the lower end of the inner tube 17 and the outer surface of the end cap 20 which keeps the valve assembly from being forced upwardly into the inner tube 17.

The combined valve generally indicated at 47 is composed of a metal reinforced material or artificial rubber compound which is not effected by the fluid passing through the cartridge. The combined valve has a reinforcing metal plate 48 substantially surrounded by a rubber compound 49 and is shaped to fit the assembly and to perform its dual function. The metal plate 48 has an upwardly extending end portion 50, an inwardly extending offset portion 51 and a downwardly extending portion 52. The end portions 50 and 52 extend in their respective directions from the offset portion 51. The upwardly extending portion 50 extends into the lower end of the inner tube 17 while the end 53 of the downwardly extending portion engages the upper surface of the lower flange 36 of the sleeve 34 adjacent the outer end of that flange. The entire metal plate 48 is embedded in the rubber compound 49 with the sole exception of the end 53 of the downwardly extending portion 52. The upwardly extending portion 50 of the metal plate 48 is entirely covered with the rubber. The rubber having an outer surface 54 closely engaging the inner surface of the inner tube 17 and forming a seal with that surface. The rubber is formed to the shape of the offset portion 51 of the metal plate 48 on the inner surface thereof and thus forms a shoulder 55 the purpose of which will be set forth later. The inner surface of the downwardly extending portion 52 of the metal plate 48 is covered with the rubber 49 to the end 53 thereof with the inner surface 56 of the rubber 49 engaging the outer surface of each of the straps 38. The inner downwardly extending portion of the rubber 49 abuts the upper surface of the flange 36 of the sleeve 34, and provides a seal therewith.

The anti-drain back valve portion of the combined valve is in the form of a resilient skirt 57 extending downwardly and outwardly from adjacent the offset portion 51 and has a substantially triangular shape in cross-section with the base adjacent the offset and the apex 58 engaging the inner surface of the closure plate 14 outwardly of the inlet openings 25, thus forming a seal with the closure plate 14 and preventing flow from the filter cartridge when not in use. The skirt 57 due to the shape thereof and the manner of extending from the offset portion 51 provides its own resiliency and does not require a high pressure to force open and will close when no pressure is applied.

The rubber 49 extends downwardly covering the downwardly extending portion 52 of the plate 48 with the end 59 thereof extending beyond the end 53 of the plate 48 and also covering the outer end of the flange 36. The end 59 of the rubber engages the inner surface of the closure plate 14 outwardly of the flange 36 and provides a seal with the closure plate.

The downwardly extending portion 60 of the rubber 49 is approximately twice the thickness of the other portions of the rubber 49 covering the plate 48.

The area over the inlet openings 25 and between the anti-drain back valve 57 and the downwardly extending portion 60 forms a pressure chamber which will receive a build-up of the pressure within the casing to open the by-pass valve. A coil spring 61 surrounds the straps 38 with the upper end engaging the under surface of the cap flange 43 and the lower end engaging shoulder 55 thus forcing the combined valve into sealing position.

The closure plate 14 has a central depressed portion 62. The depressed portion is connected to the outer portion 63 of the closure plate 14 by a downwardly and inwardly extending portion 64. The central depressed portion 62 has the inlet openings 25 therein inwardly of the portion 64. The apex 58 of the anti-drain back valve engages the closure plate outwardly of the portion 64.

A coil spring 65 engages the closed end 12 of the container or housing 10 on one end and the end cap 19 on the other end and forces the filter element downwardly against the flange 46 of the valve assembly.

In assembling the filter cartridge the coil spring 65 is first placed in the housing 10, the valve assembly 33 is forced into the end of the inner tube 17 of the filter element and the element placed in the housing. Next the closure plate 14 is seated in the open end of the housing 10 and sealed thereto by any known means. The closure plate 14 engages the lower end of the valve assembly 33 first forcing the same into the inner tube 17 until the flange 36 is well seated and then forcing the filter element 15 upwardly against the coil spring 65.

When the filter cartridge is in position for use the fluid under ordinary conditions will under the low pressure used force and anti-drain back valve upwardly thus removing the apex 58 from the closure plate 14 and allow the fluid to enter the housing where it will pass through the filter element and be filtered thereby. After being filtered the fluid will flow from the element through the sleeve 34, nipple 24 into outlet 27 to the point of use. In cold weather conditions when the fluid may be very viscous and will not flow through the filter media and or when the filter media becomes clogged with the filtrate a high pressure condition of the fluid will build up in the cartridge and in the pressure chamber between the skirt 57 and the downwardly extending portion 60 thus forcing the valve assembly 33 upwardly against the pressure of the coil spring 61 thus opening the by-pass and allowing flow through the openings 39 into the sleeve 34 thence into the aforementioned nipple and outlet.

Having now shown and described one form of the invention it is to be understood that such is not in any way limiting to the scope of the claims appended hereunto.

I claim:

1. A spin-on throw-away filter cartridge comprising a casing having a closed end and an open end, plate means closing the open end and having inlet and outlet openings therein, a filtering element in the casing, the filter being spaced from the casing and the plate means, a supporting cap having a body portion with upper and lower flanges thereon, the body portion engaging the inner lower end portion of the filtering element and the lower flange engaging the lower end of the filtering element, a cylindrical sleeve having one end extending into the lower end portion of the filtering element and spaced inwardly therefrom, the one end of the sleeve being supported by the upper flange of the supporting cap and held in inward spaced relation to the body portion of the supporting cap, the other end of the sleeve surrounding the outlet opening and engaging the plate means, the sleeve having a flow passage therethrough and flow openings in the wall thereof, a combined anti-drain back and relief valve surrounding the sleeve, the valve being of a molded one piece reinforced elastomeric compound construction having a body portion with upper and lower end portions and a skirt extending outwardly from the body portion, the reinforcement being within the body and each end portion, the upper end portion extending into the space between the sleeve and cap body portion and being offset outwardly of the body portion thereof and slidably engaging the cap body portion, the lower end portion being inwardly of a vertical line taken through the upper end portion and slidably engaging the other end of the sleeve, the lower end portion of the valve seating on the plate means inwardly of the inlet openings and outwardly of the outlet opening and sealing the inlet from the outlet, resilient means surrounding the sleeve between the upper flange of the cap and the body portion of the valve and urging the valve into sealing engagement, the skirt being solely of the elastomeric construction and flexible, the skirt having a free end thereon engaging the plate means outwardly of the inlet openings and forming the anti-drain back valve portion of the combined valve, the lower end portion of the valve forming the by-pass portion of the combined valve, the skirt and lower end portion of the valve being spaced apart above the inlet openings and forming a pressure chamber over the inlet openings, the anti-drain back valve operating under normal pressure of the fluid to be filtered to allow fluid to flow into the casing through the inlet openings and be filtered by the filtering element, under abnormal conditions a high pressure is built up in the casing and in the pressure chamber forcing the valve body upwardly on the sleeve against the resilient means and causing the lower end portion of the valve to unseat from the plate means and to uncover the flow openings in the sleeve allowing the fluid to by-pass the filtering element and flow directly through the outlet.

2. The filter cartridge as set forth in claim 1 wherein the sleeve has a plurality of pairs of slits formed therein with the material of the sleeve between the pairs of slits being forced outwardly of the sleeve forming straps with the flow openings in the wall of the sleeve being between the pairs of slits after forcing the straps from the wall.

3. The filter cartridge as set forth in claim 2 wherein the sleeve has upper and lower flanges, the upper flange of the sleeve engaging the upper face of the upper flange of the supporting cap, the lower flange of the sleeve supported on the upper face of the plate means, the strap having a flange at the upper end thereof engaging the lower face of the upper flange of the cap and the slits extending into the lower flange of the sleeve to a distance approximately one-half of the width of the lower flange of the sleeve.

4. The filter cartridge as set forth in claim 1 wherein the reinforcement of the combined valve is of metal and has an offset in the body thereof substantially in the mid portion thereof, the valve body portion being substantially at the mid portion thereof and being offset inwardly, a shoulder in the body portion adjacent the offset, and the resilient means engaging the shoulder to force the valve into sealing engagement.

5. The filter cartridge as set forth in claim 4 wherein the metal reinforcement is substantially completely covered by the rubber compound, with the rubber on the inner surface of the lower end portion of the valve being co-extensive with the metal reinforcement while the outer surface of the rubber of the lower end portion of the valve is longer than the metal reinforcement and engages the upper surface of the plate means with sealing of the engagement.

6. The filter cartridge as set forth in claim 1 wherein the anti-drain back valve is of a substantially triangular configuration in cross section with the base thereof being adjacent the body portion of the valve and the apex engaging the upper surface of the plate means outwardly of the inlet openings and forming a seal with the plate means.

7. The filter cartridge as set forth in claim 6 wherein the anti-drain back valve is composed solely of the rubber compound and is resilient in and of itself and will react under normal operating pressure to open the casing to flow therethrough.

References Cited

UNITED STATES PATENTS 3,231,089   1/1966   Thornton _____ 210—130
3,235,085   2/1966   Humbert _____ 210—130

REUBEN FRIEDMAN, Primary Examiner

F. A. SPEAR, JR., Assistant Examiner

U.S. Cl. X.R.
210—136, 440, 443